US012444518B2

(12) United States Patent
Haraguchi

(10) Patent No.: US 12,444,518 B2
(45) Date of Patent: Oct. 14, 2025

(54) ENERGY BEAM IRRADIATION DEVICE

(71) Applicant: HAMAMATSU PHOTONICS K.K., Hamamatsu (JP)

(72) Inventor: Dai Haraguchi, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 330 days.

(21) Appl. No.: 17/918,153

(22) PCT Filed: Jan. 28, 2021

(86) PCT No.: PCT/JP2021/003091
§ 371 (c)(1),
(2) Date: Oct. 11, 2022

(87) PCT Pub. No.: WO2021/210239
PCT Pub. Date: Oct. 21, 2021

(65) Prior Publication Data

US 2023/0134054 A1 May 4, 2023

(30) Foreign Application Priority Data

Apr. 13, 2020 (JP) ................................ 2020-071472

(51) Int. Cl.
*G21K 5/00* (2006.01)
*H01J 1/88* (2006.01)
*H01J 33/04* (2006.01)

(52) U.S. Cl.
CPC ................ *G21K 5/00* (2013.01); *H01J 33/04* (2013.01); *H01J 1/88* (2013.01)

(58) Field of Classification Search
CPC .... G21K 5/00; H01J 33/04; H01J 1/88; H01J 33/02; A61L 2/087
See application file for complete search history.

(56) References Cited

U.S. PATENT DOCUMENTS 7,672,048 B2 * 3/2010 Tomitori ................ G01Q 10/04 359/393
9,142,377 B2 9/2015 Wittwer et al.
(Continued)

FOREIGN PATENT DOCUMENTS

CN 1954402 A 4/2007
CN 102884222 A 1/2013
(Continued)

OTHER PUBLICATIONS

International Preliminary Report on Patentability mailed Oct. 27, 2022 for PCT/JP2021/003091.
(Continued)

*Primary Examiner* — Wyatt A Stoffa
*Assistant Examiner* — Christopher J Gassen
(74) *Attorney, Agent, or Firm* — Faegre Drinker Biddle & Reath LLP

(57) ABSTRACT

Disclosed is an energy beam emission device including: an electron discharge unit having a long electron discharge part; a housing having a window from which energy beams are emitted on the basis of electrons discharged from the electron discharge part; and a unit accommodation part capable of accommodating the electron discharge unit. A plurality of positioning parts are provided between an outer surface of the electron discharge unit and an inner surface of the unit accommodation part, the positioning parts being slidably in contact with an outer surface of the electron discharge unit or an inner surface of the unit accommodation part and performing positioning of the electron discharge part with respect to the unit accommodation part.

9 Claims, 11 Drawing Sheets

(56) References Cited

U.S. PATENT DOCUMENTS

| | | | |
|---|---|---|---|
| 2009/0032702 | A1 | 2/2009 | Quarmby et al. |
| 2014/0091702 | A1 | 4/2014 | Wittwer et al. |
| 2017/0365439 | A1 | 12/2017 | Takahashi et al. |

FOREIGN PATENT DOCUMENTS

| | | | |
|---|---|---|---|
| CN | 206907734 | U | 1/2018 |
| EP | 2174340 | B1 | 12/2017 |
| JP | 2001-021700 | A | 1/2001 |
| JP | 2003-014398 | A | 1/2003 |
| JP | 2003-149398 | A | 5/2003 |
| JP | 2005-300327 | A | 10/2005 |
| JP | 2009-162577 | A | 7/2009 |
| JP | 2013-098090 | A | 5/2013 |
| JP | 2014-526037 | A | 10/2014 |
| JP | 2018-048828 | A | 3/2018 |
| TW | 201211293 | A | 3/2012 |
| WO | WO-2013/004565 | A1 | 1/2013 |

OTHER PUBLICATIONS

Yonago, Akinobu et al., "Ultra-Low-Energy Wide Electron Exposure Unit," Mitsubishi Heavy Industries, Ltd. Technical Review, vol. 38, No. 3, 2001-05, pp. 174-177, with partial English translation.

* cited by examiner

ENERGY BEAM IRRADIATION DEVICE

TECHNICAL FIELD

The present disclosure relates to an energy beam emission device.

BACKGROUND ART

Patent Literature 1 describes an electron beam emission device including a long electron discharge part. In this electron beam emission device, an electron discharge part is attached to a long connecting plate, and the connecting plate is slidably placed on a long rail. As a result, in this electron beam emission device, the electron discharge part can be taken out together with the connecting plate by the connecting plate being slid along the rail.

CITATION LIST

Patent Literature

[Patent Literature 1] Japanese Unexamined Patent Publication No. 2003-149398

SUMMARY OF INVENTION

Technical Problem

The above-mentioned electron beam emission device has a configuration in which a lower surface of the long connecting plate is brought into contact with an upper surface of the long rail when an electron discharge unit including the electron discharge part is disposed in a housing. Therefore, this electron beam emission device is easily affected by the accuracy of each of the rail and the connecting plate, the arrangement accuracy of each member, and the like, and the electron discharge unit may not be stably disposed in the electron beam emission device.

Therefore, an object of the present disclosure is to provide an energy beam emission device capable of stably disposing an electron discharge unit.

Solution to Problem

According to an aspect of the present disclosure, there is provided an energy beam emission device including: an electron discharge unit having a long electron discharge part; a housing having a window from which energy beams are emitted on the basis of electrons discharged from the electron discharge part; and a unit accommodation part fixed in the housing, having a long tubular shape capable of accommodating the electron discharge unit, and having an electron discharge opening formed in a portion of an outer peripheral surface facing the window, wherein a plurality of positioning parts are provided between an outer surface of the electron discharge unit and an inner surface of the unit accommodation part, the positioning parts being slidably in contact with an outer surface of the electron discharge unit or an inner surface of the unit accommodation part and performing positioning of the electron discharge part with respect to the unit accommodation part, and wherein the electron discharge unit is capable of being inserted into the unit accommodation part from an end of the unit accommodation part.

In this energy beam emission device, the plurality of positioning parts are provided between the outer surface of the electron discharge unit and the inner surface of the unit accommodation part, the positioning parts being slidably in contact with the outer surface of the electron discharge unit or the inner surface of the unit accommodation part. That is, the long electron discharge unit is disposed in the unit accommodation part by being supported at a plurality of positions where the positioning parts are provided. As a result, in the energy beam emission device, it is possible to stably dispose the electron discharge unit even if the electron discharge unit has a long shape.

The energy beam emission device may further include: a power supply part configured to supply electric power to the electron discharge unit, wherein the electron discharge unit may be capable of being inserted into the unit accommodation part from one end of the unit accommodation part, and wherein the power supply part may be provided in the housing on the other end side of the unit accommodation part and may be in contact with the electron discharge unit to be electrically connected to the electron discharge unit in a state where the electron discharge unit is inserted into the unit accommodation part. In this case, in the energy beam emission device, it is possible to electrically connect the electron discharge unit and the power supply part to each other by performing work of disposing the electron discharge unit in the unit accommodation part (work of inserting the electron discharge unit into the unit accommodation part) without performing special work for connecting the electron discharge unit and the power supply part.

One end of the housing may be provided with an introduction opening into which the electron discharge unit is capable of being introduced and which is opened and closed by a lid. In this case, in the energy beam emission device, the electron discharge unit can be attached to and detached from the unit accommodation part via the introduction opening of the housing.

An outer surface of the positioning part may have a protruding curved surface shape. In this case, the positioning part can slide smoothly with respect to the outer surface of the electron discharge unit or the inner surface of the unit accommodation part. As a result, in the energy beam emission device, the electron discharge unit can be easily attached to and detached from the unit accommodation part.

The positioning part may include a spherical body that is in contact with the outer surface of the electron discharge unit or the inner surface of the unit accommodation part and a holding part that rotatably holds the spherical body. In this case, the electron discharge unit can smoothly slide in the unit accommodation part by the spherical body of the positioning part being rotated. As a result, in the energy beam emission device, the electron discharge unit can be easily attached to and detached from the unit accommodation part.

The plurality of positioning parts may be provided in an extending direction of the electron discharge part. In this case, in the energy beam emission device, it is possible to curb the electron discharge unit being slantwise accommodated with respect to the extending direction of the unit accommodation part, and it is possible to stably dispose the electron discharge unit.

The positioning part may be provided at each of both ends on one side and the other side in an extending direction of the electron discharge part. In this case, in the energy beam emission device, it is possible to further curb the electron discharge unit being slantwise accommodated with respect to the extending direction of the unit accommodation part, and it is possible to further stably dispose the electron discharge unit.

The positioning part may be provided on the outer surface of the electron discharge unit and may be provided at each of a plurality of positions in an extending direction of the electron discharge part in a position on a tip end side in an insertion direction into the unit accommodation part with respect to a central position in the extending direction of the electron discharge part. In this case, in the energy beam emission device, when the long electron discharge unit is inserted into the unit accommodation part, two or more positioning parts disposed closer to the end on the tip end side in the insertion direction with respect to the central position in the extending direction come into contact with the unit accommodation part at an early stage of insertion. That is, in the energy beam emission device, when the long electron discharge unit is inserted, the electron discharge unit is positioned with respect to the unit accommodation part at a stage at which the tip end thereof is inserted. As a result, in the energy beam emission device, it is possible to stably attach and detach the electron discharge unit to and from the unit accommodation part even in a case where the electron discharge unit has a long shape.

The plurality of positioning parts may be provided in a circumferential direction of the electron discharge unit. In this case, in the energy beam emission device, it is possible to stabilize the position of the electron discharge unit in the unit accommodation part in a direction orthogonal to the extending direction of the electron discharge part.

The energy beam emission device may further include: a projection projecting from an outer surface side of the unit accommodation part toward an inner surface side of the unit accommodation part, wherein the electron discharge unit may further have a rotation restricting member in which a groove extending in an extending direction of the electron discharge part is formed in an outer edge, and wherein a position of the electron discharge unit in a rotation direction in the unit accommodation part may be determined by the projection being fitted into the groove. In this case, in the energy beam emission device, the position (the orientation) of the electron discharge unit in the rotation direction when seen in the extending direction of the electron discharge unit can be determined by the groove and the projection.

The projection may be provided on each of both end sides of the unit accommodation part, and the rotation restricting member may be provided on each of both end sides of the electron discharge unit. In this case, in the energy beam emission device, the position of the electron discharge unit in the rotation direction at both ends of the electron discharge unit can be determined, and the electron discharge unit can be stably disposed.

The energy beam emission device may constitute an electron beam emission device that emits the electrons from the window as the energy beams. Further, the energy beam emission device may further include: an X-ray generation part configured to generate X-rays when the electrons discharged from the electron discharge part are incident, wherein the energy beam emission device may constitute an X-ray emission device that emits the X-rays from the window as the energy beams. In this case, it is possible to obtain an electron beam emission device and an X-ray emission device capable of stably disposing the electron discharge unit.

Advantageous Effects of Invention

According to the present disclosure, it is possible to stably dispose an electron discharge unit.

BRIEF DESCRIPTION OF DRAWINGS

FIG. 11(*b*) is a cross-sectional view showing a configuration of the filament unit and the rail in a case where the filament unit emits electron beams in a downward direction.

DESCRIPTION OF EMBODIMENTS

Figure 1:
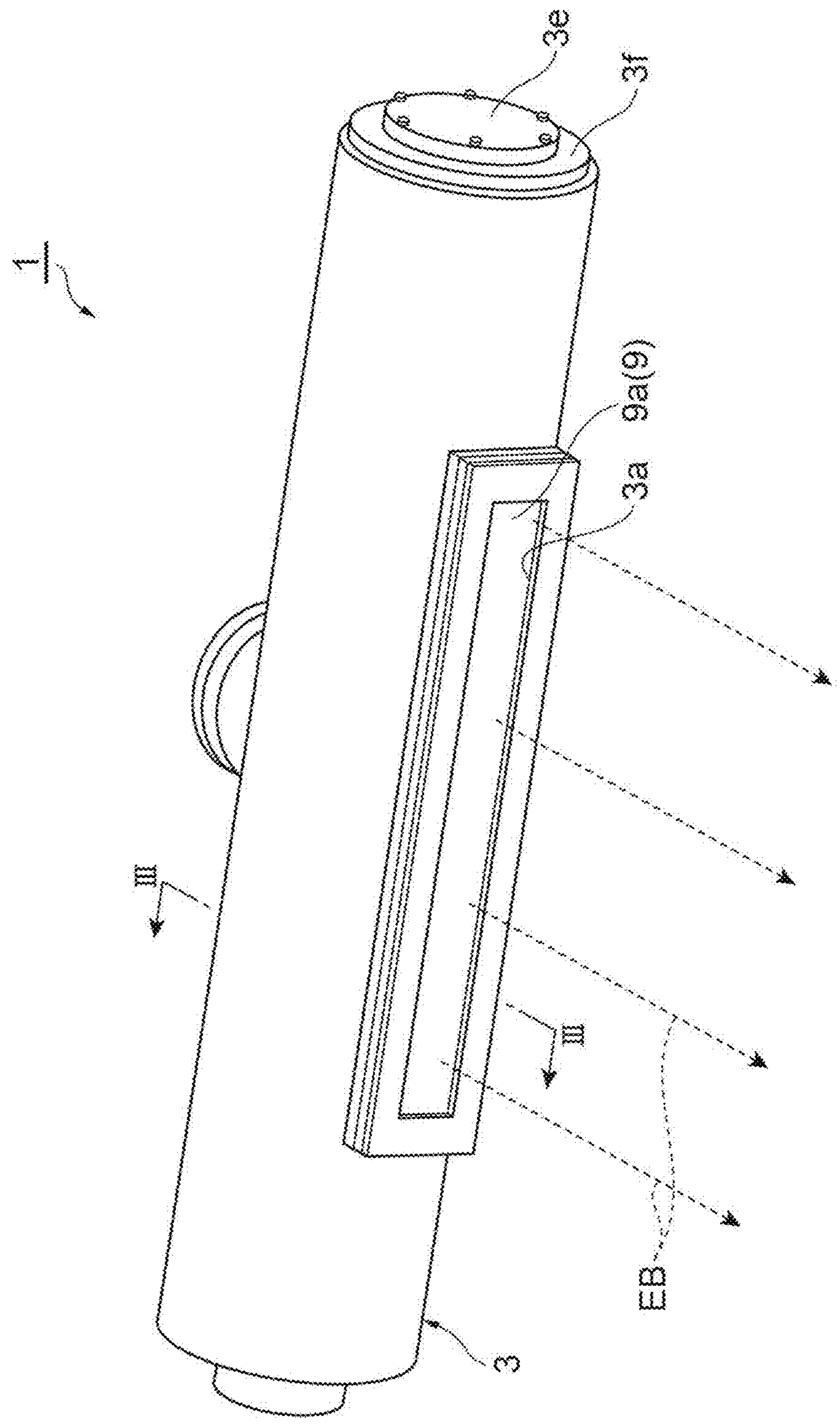
FIG. 1 is a perspective view of an electron beam emission device according to an embodiment.

Hereinafter, an embodiment of the present disclosure will be described with reference to the drawings. In the drawings, the same or corresponding elements will be denoted by the same reference signs and redundant description will be omitted.

An electron beam emission device (an energy beam emission device) 1 shown in FIG. 1 is used for, for example, ink curing, sterilizing, or surface reforming on an irradiation target by irradiating the irradiation target with electron beams (energy beams) EB. Hereinafter, an electron beam emitting side (a side of a window 9) which is a side from which the electron beams EB are emitted by the electron beam emission device 1 will be described as a "front side."

Figure 2:
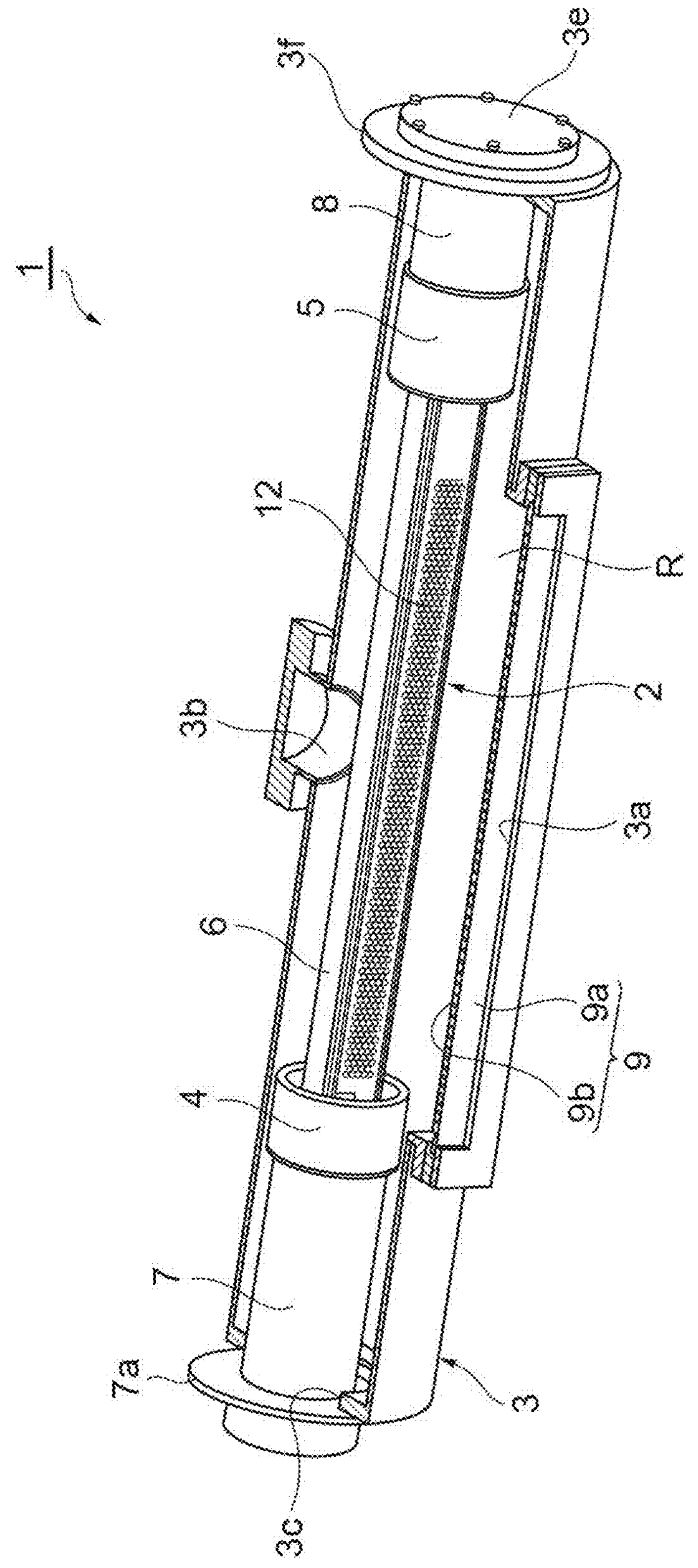
FIG. 2 is a partial cross-sectional view showing an internal structure of the electron beam emission device of FIG. 1.
Figure 3:
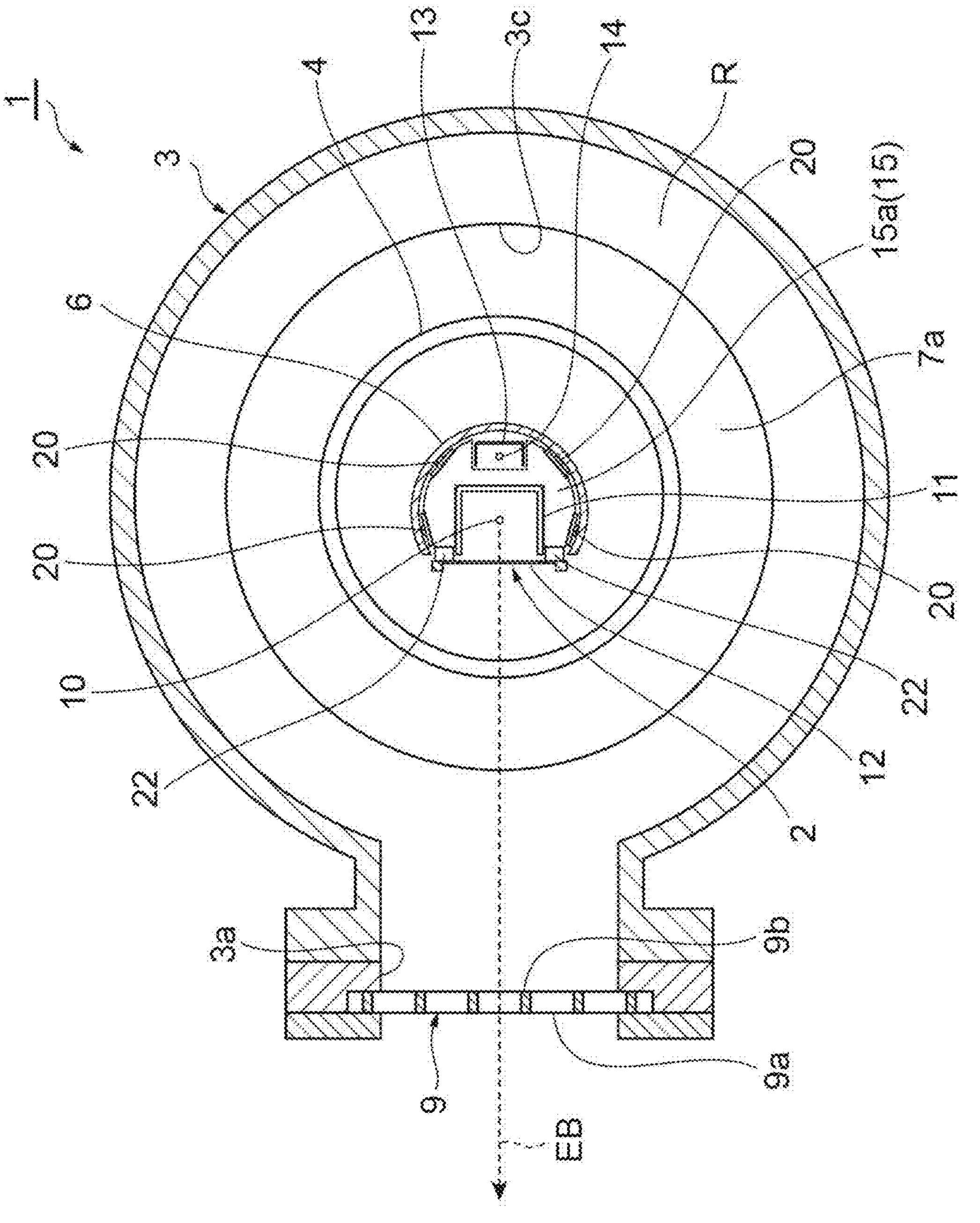
FIG. 3 is a cross-sectional view along line III-III of FIG. 1.
Figure 4:
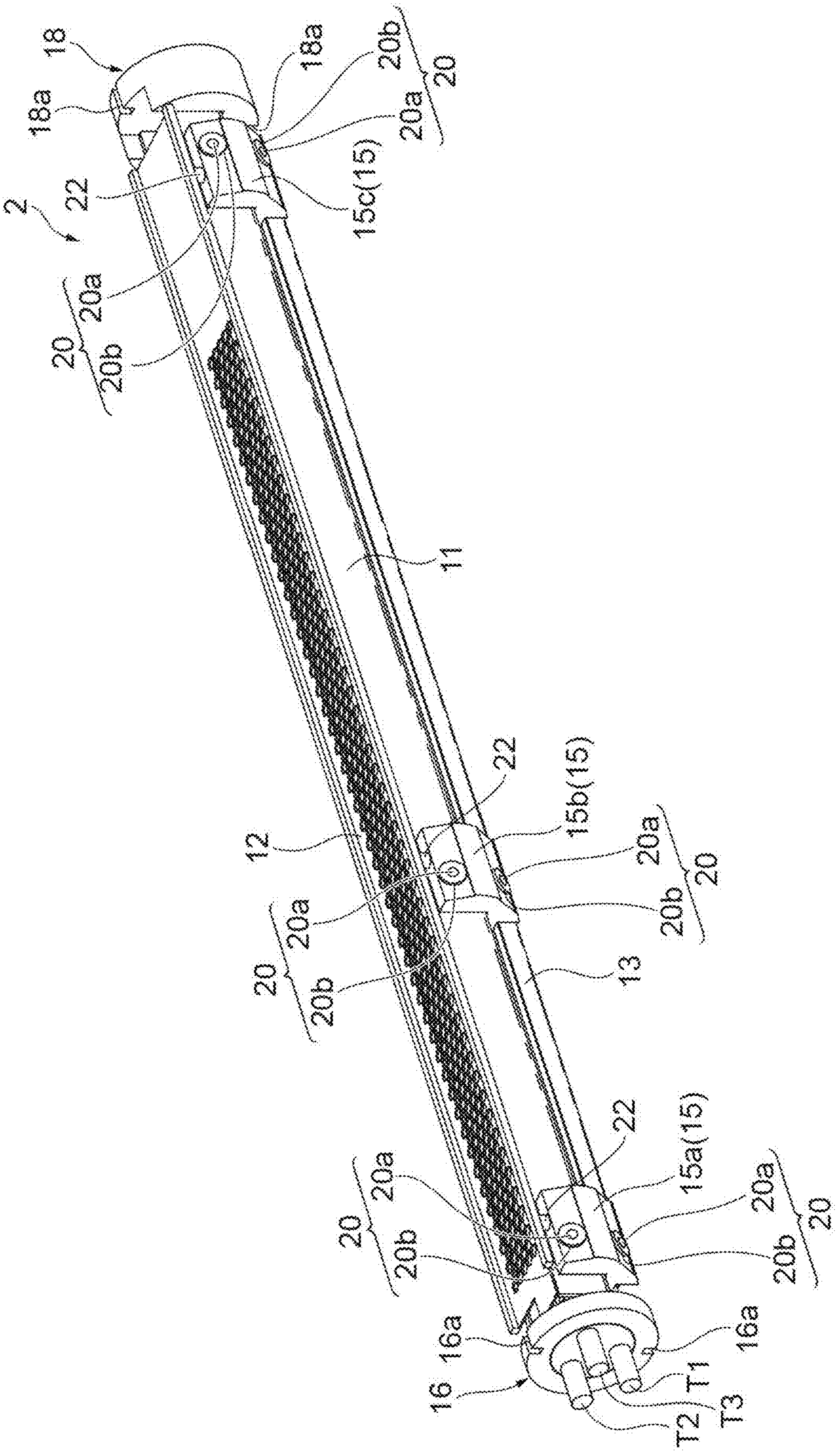
FIG. 4 is a perspective view of a filament unit.

As shown in FIGS. 1 to 3, the electron beam emission device 1 includes a filament unit (an electron discharge unit) 2, a vacuum container (a housing) 3, a cathode holding member 4, a cathode holding member 5, a rail (a unit accommodation part) 6, a high voltage introduction insulation member (a power supply part) 7, and an insulation support member 8. The filament unit 2 is an electron beam generation unit that generates the electron beams EB. Further, the filament unit 2 is a long unit.

The vacuum container 3 is formed of a conductive material such as a metal. The vacuum container 3 has a substantially cylindrical shape. The vacuum container 3 forms a vacuum space R having a substantially circular column shape inside. The filament unit 2 is disposed inside the vacuum container 3 in an axial direction (a major axis direction) of the vacuum space R having a substantially circular column shape. An opening 3*a* through which the vacuum space R and an external space communicate with each other is provided at a position on the front side in the vacuum container 3 with respect to the filament unit 2. The vacuum container 3 includes a window 9 through which electrons discharged from the filament unit 2 pass. The window 9 is fixed to the opening 3*a* to be vacuum-sealed.

The window 9 includes a window material 9*a* and a support 9*b*. The window material 9*a* is formed in a thin film shape. As a material of the window material 9*a*, a material having excellent transparency for the electron beams EB (for example, beryllium, titanium, aluminum, or the like) is used. The support 9*b* is disposed on a side of the vacuum space R of the window material 9*a* and supports the window material 9*a*. The support 9*b* is a mesh-like member and has a plurality of holes through which the electron beams EB pass.

An exhaust port 3*b* for exhausting air in the vacuum container 3 is provided at a position on a rear side in the vacuum container 3 with respect to the filament unit 2. A vacuum pump (not shown) is connected to the exhaust port 3*b*, and the air in the vacuum container 3 is discharged by the vacuum pump. As a result, the inside of the vacuum container 3 becomes the vacuum space R. An opening 3*c* at the other end of the vacuum container 3 having a substantially cylindrical shape is closed by a flange 7*a* of the high voltage introduction insulation member 7. A housing end plate 3*f* is provided at one end of the vacuum container 3. The housing end plate 3*f* is provided with an insertion opening (an introduction opening) 3*d* (see FIG. 6) through which an inside space and an outside space of the vacuum container 3 communicate with each other. The insertion opening 3*d* has a size that allows the filament unit 2 to be introduced. The insertion opening 3*d* is closed by a lid 3*e* provided to be openable and closable (here, attachable and detachable) with respect to the housing end plate 3*f*.

A pair of cathode holding members 4 and 5 that have a cathode potential are disposed in the vacuum container 3. The rail 6 which has a cathode potential and also serves as a surrounding electrode that surrounds the filament unit 2 is provided between the cathode holding member 4 on the other side and the cathode holding member 5 on one side. The rail 6 is a conductive and long member having a substantially C-shaped cross section. The rail 6 is disposed such that an opening having a substantially C-shaped cross section faces the front side (a side of the window 9). The rail 6 holds the filament unit 2 in an inside portion (an internal space). In other words, the rail 6 has a long tubular shape capable of accommodating the filament unit 2. Further, the rail 6 has an opening (an electron discharge opening) formed in a portion of an outer peripheral surface facing the window 9. Both ends of the rail 6 are fixed to the vacuum container 3 by the cathode holding member 4 and the high voltage introduction insulation member 7 and the cathode holding member 5 and the insulation support member 8.

The insertion opening 3*d* of the housing end plate 3*f* faces one end (an end on a side fixed to the cathode holding member 5) of the rail 6. The filament unit 2 is inserted into the inside (an inside space) of the rail 6 from the one end of the rail 6 through the insertion opening 3*d* of the housing end plate 3*f* and insertion holes 5*a* and 8*a* (see FIG. 8) provided in the cathode holding member 5 and the insulation support member 8 in a state where the lid 3*e* of the vacuum container 3 is removed (opened). As a result, the filament unit 2 is held by the rail 6. In this way, the filament unit 2 can be inserted and removed (inserted to be attachable and detachable) with respect to the rail 6 from the one end of the rail 6.

The high voltage introduction insulation member 7 supplies electric power to the filament unit 2. The high voltage introduction insulation member 7 is provided at an end of the vacuum container 3 on a side of the opening 3*c* on the other side. The other end of the high voltage introduction insulation member 7 projects to the outside of the vacuum container 3 through the opening 3*c*. The high voltage introduction insulation member 7 has the flange 7*a* protruding outward in a radial direction thereof and seals the opening 3*c* of the vacuum container 3. The high voltage introduction insulation member 7 is formed of an insulation material (for example, an insulation resin such as an epoxy resin, ceramic, or the like). The cathode holding member 4 holds one end of the high voltage introduction insulation member 7 in a state where the cathode holding member 4 is electrically insulated from the vacuum container 3 which has a ground potential.

Further, the high voltage introduction insulation member 7 is a high withstand voltage type connector for receiving supply of a high voltage from a power source device outside the electron beam emission device 1. A plug for supplying a high voltage from the power source device (not shown) is inserted into the high voltage introduction insulation member 7. An internal wiring for supplying a high voltage supplied from the outside to the filament unit 2 and the like is provided inside the high voltage introduction insulation member 7. This internal wiring is covered with an insulation material constituting the high voltage introduction insulation member 7, and insulation with respect to the vacuum container 3 is ensured. The one end disposed in the vacuum container 3 of the high voltage introduction insulation member 7 (the end on a side supporting the cathode holding member 4) faces the other end of the rail 6 (the end on a side fixed to the cathode holding member 4).

The insulation support member 8 is provided at an end of the vacuum container 3 on a side where the housing end plate 3*f* on the one side is provided (an end on a side of the lid 3*e*). The insulation support member 8 is formed of an insulation material (for example, an insulation resin such as an epoxy resin, ceramic, or the like). The insulation support member 8 is supported by the housing end plate 3*f*. The cathode holding member 5 is supported by the insulation support member 8 in a state where the cathode holding member 5 is electrically insulated from the vacuum container 3.

As shown in FIGS. 3 to 6, the filament unit 2 is configured as one unit to be attachable to and detachable from the rail 6. The filament unit 2 includes a filament (an electron discharge part) 10, a main frame 11, a grid electrode 12, a sub frame 13, a power supply line 14, a guide member 15, a terminal holding member (a rotation restricting member) 16, a filament fixing member 17, a rotation restricting member 18, and a tension holding unit 19.

The main frame 11 is a long member having a substantially U-shaped (C-shaped) cross section. The main frame 11 is disposed such that an opening having a substantially U-shaped cross section faces the front side (a side of the window 9). The filament fixing member 17 is provided at the other end of the main frame 11 in the inside (an inside space) of the main frame 11. Further, the tension holding unit 19 is provided at one end of the main frame 11 in the inside (the inside space) of the main frame 11.

The filament 10 is an electron discharge part that discharges electrons that become the electron beams EB when heated by energization. The filament 10 is a linear member and is a long member that extends on a desired axis L extending from one side to the other side. The filament 10 is formed of a metal material having a high melting point, for example, a material containing tungsten as a main component. One end of the filament 10 is connected to the tension holding unit 19. The other end of the filament 10 is connected to the filament fixing member 17.

The terminal holding member 16 is attached to the other end of the main frame 11. The terminal holding member 16 holds a filament terminal T1 for supplying a current for the filament 10 to discharge electrons, a high voltage terminal T2 for supplying a cathode potential to the filament unit 2, and a grid electrode terminal T3 for supplying an applied voltage to the grid electrode 12 in a state where the terminals T1, T2, and T3 are electrically insulated from each other. The filament terminal T1 is connected to the other end of the power supply line 14. The high voltage terminal T2 is electrically connected to the filament fixing member 17. A guide groove (a groove) 16*a* extending in a direction of the axis L (an extending direction of the filament 10) is provided in an outer edge of the terminal holding member 16. In the present embodiment, the terminal holding member 16 is provided with two guide grooves 16*a*. The two guide grooves 16*a* are provided to face each other with the axis L interposed therebetween in the direction of the axis L. The filament unit 2 is inserted into the inside of the rail 6 from the one end of the rail 6 through the insertion opening 3*d* of the housing end plate 3*f* and insertion holes 5*a* and 8*a* provided in the cathode holding member 5 and the insulation support member 8 with the other end provided with the terminal holding member 16 as a head.

The rotation restricting member 18 is attached to the one end of the main frame 11. That is, the filament fixing member 17 and the rotation restricting member 18 are provided at the positions of both ends of the filament unit 2. A guide groove (a groove) 18*a* extending in a direction of the axis L (an extending direction of the filament 10) is provided in an outer edge of the rotation restricting member 18. In the present embodiment, the rotation restricting member 18 is provided with two guide grooves 18*a*. The two guide grooves 18*a* are provided to face each other with the axis L interposed therebetween in the direction of the axis L. In the present embodiment, the guide groove 16*a* and the guide groove 18*a* are provided such that the guide groove 16*a* and the guide groove 18*a* overlap each other in the direction of the axis L.

The sub frame 13 is a long member having a substantially U-shaped cross section. The sub frame 13 is disposed in parallel with the main frame 11. The power supply line 14 is connected to the tension holding unit 19 from a connection position with the filament terminal T1 through the inside (an inside space) of the sub frame 13, and the sub frame 13 has a protective function for the power supply line 14. The main frame 11 and the sub frame 13 are connected to each other by a plurality of guide members 15.

Figure 5:
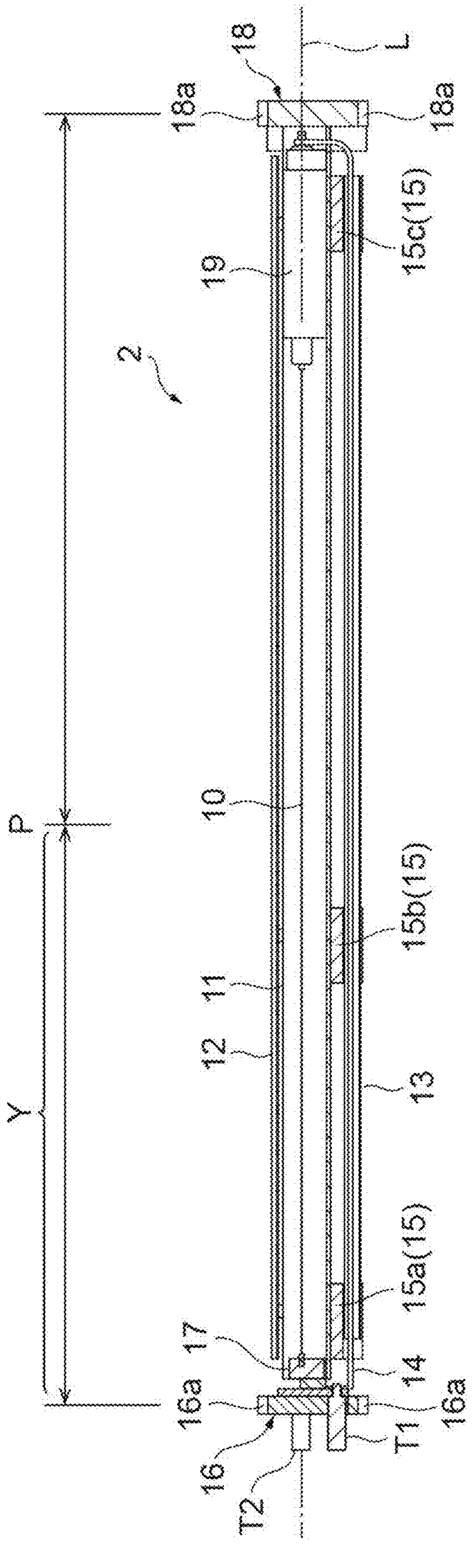
FIG. 5 is a partial cross-sectional view of the filament unit.

In the present embodiment, the guide member 15 includes a first guide part 15*a*, a second guide part 15*b*, and a third guide part 15*c*. The first guide part 15*a* connects the main frame 11 and the sub frame 13 to each other at the other end of the filament unit 2 where the terminal holding member 16 is provided. The third guide part 15*c* connects the main frame 11 and the sub frame 13 to each other at the one end of the filament unit 2 where the rotation restricting member 18 is provided. In this way, the first guide part 15*a* and the third guide part 15*c* are provided at the positions of both ends of the filament unit 2. The second guide part 15*b* connects the main frame 11 and the sub frame 13 to each other at a position between the first guide part 15*a* and the third guide part 15*c*. Here, as shown in FIG. 5, a position of a center of the filament unit 2 in the extending direction is defined as a central position P. Further, in the filament unit 2, a portion on a side of the terminal holding member 16 with respect to the central position P (the other side: a tip end side in the insertion direction into the rail 6) is defined as a tip end side portion Y. In the present embodiment, the second guide part 15*b* is provided in the tip end side portion Y of the filament unit 2. That is, the tip end side portion Y is provided with the first guide part 15*a* and the second guide part 15*b*.

A plurality of positioning parts 20 are provided on the outer surface of the first guide part 15*a*. The positioning part 20 is slidably in contact with the inner surface of the rail 6 to position the filament unit 2 with respect to the rail 6. In the present embodiment, as shown in FIG. 3, the plurality of positioning parts 20 are provided on the outer surface of the first guide part 15*a* (the filament unit 2) in a circumferential direction of the filament unit 2. The circumferential direction of the filament unit 2 is a direction that orbits (rotates) around the filament unit 2 with the extending direction of the long filament unit 2 as an axis. Four positioning parts 20 are provided with respect to the first guide part 15*a*.

The positioning part 20 includes a spherical body 20*a* and a holding part 20*b*. The spherical body 20*a* is in contact with the inner surface of the rail 6. The holding part 20*b* rotatably holds the spherical body 20*a* with respect to the first guide part 15*a*. Further, the holding part 20*b* holds the spherical body 20*a* in a state where a part of the spherical body 20*a* is exposed such that the spherical body 20*a* can be in contact with the inner surface of the rail 6. As a result, when the filament unit 2 is slid in the inside (an internal space) of the rail 6, the spherical body 20*a* can be easily slid by rotating.

The second guide part 15*b* and the third guide part 15*c* are each provided with a plurality of positioning parts 20. The positioning part 20 provided in each of the second guide part 15*b* and the third guide part 15*c* has the same configuration as the positioning part 20 provided in the first guide part 15*a*, and detailed description thereof will be omitted.

As described above, the positioning part 20 is provided in each of the first guide part 15*a* to the third guide part 15*c*, and thus a plurality of positioning parts 20 are provided in the extending direction of the filament 10. That is, the positioning part 20 is provided at each of a plurality of positions in the extending direction of the filament 10.

Further, the positioning part 20 is provided in each of the first guide part 15*a* and the third guide part 15*c* positioned at both ends of the filament unit 2. That is, the positioning part 20 is provided at each of the positions of both ends of the filament unit 2 on one side and the other side in the extending direction of the filament 10.

The tip end side portion Y of the filament unit 2 is provided with the first guide part 15*a* and the second guide part 15*b*. That is, the filament unit 2 is provided with the positioning part 20 of the first guide part 15*a* and the positioning part 20 of the second guide part 15*b* at the plurality of positions in the extending direction of the filament unit 2 in the tip end side portion Y.

The grid electrode 12 is disposed on the front side with respect to the filament 10 and is supported by the guide member 15 via an insulation member 22. A plurality of holes are formed in the grid electrode 12 (see FIG. 4 and the like). The grid electrode 12 is electrically connected to the grid electrode terminal T3 via a wiring (not shown).

The tension holding unit 19 holds tension of the filament 10. Here, the tension holding unit 19 can hold the tension of the filament 10 by pressing or pulling a movable body connected to the end of the filament 10 on the one side by a spring. The tension holding unit 19 is attached to the main frame 11 in a state where the tension holding unit 19 is electrically insulated from the main frame 11 via an insulation member or the like. One end of the power supply line 14 is connected to the tension holding unit 19. The tension holding unit 19 can supply the electric power supplied via the power supply line 14 to the filament 10 while holding the tension of the filament 10.

Figure 6:
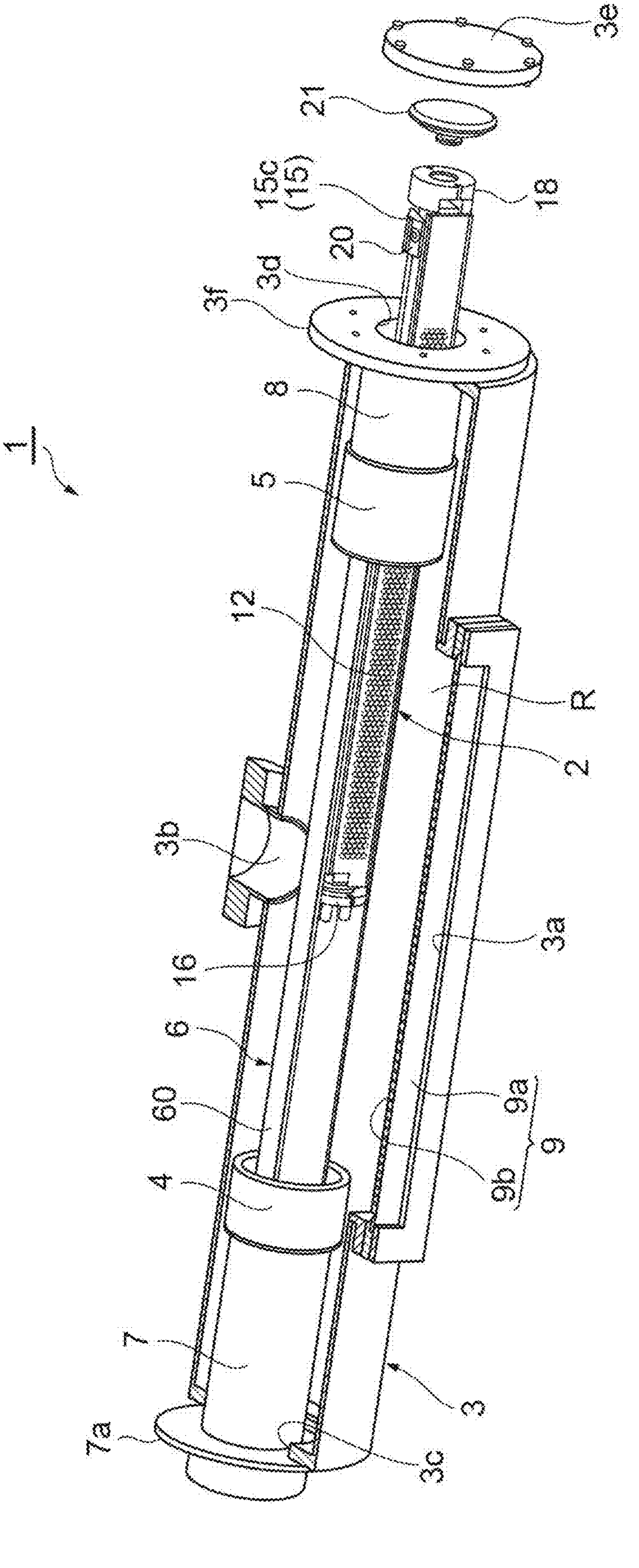
FIG. 6 is a partial cross-sectional view showing how the filament unit is inserted into a rail.
Figure 7:
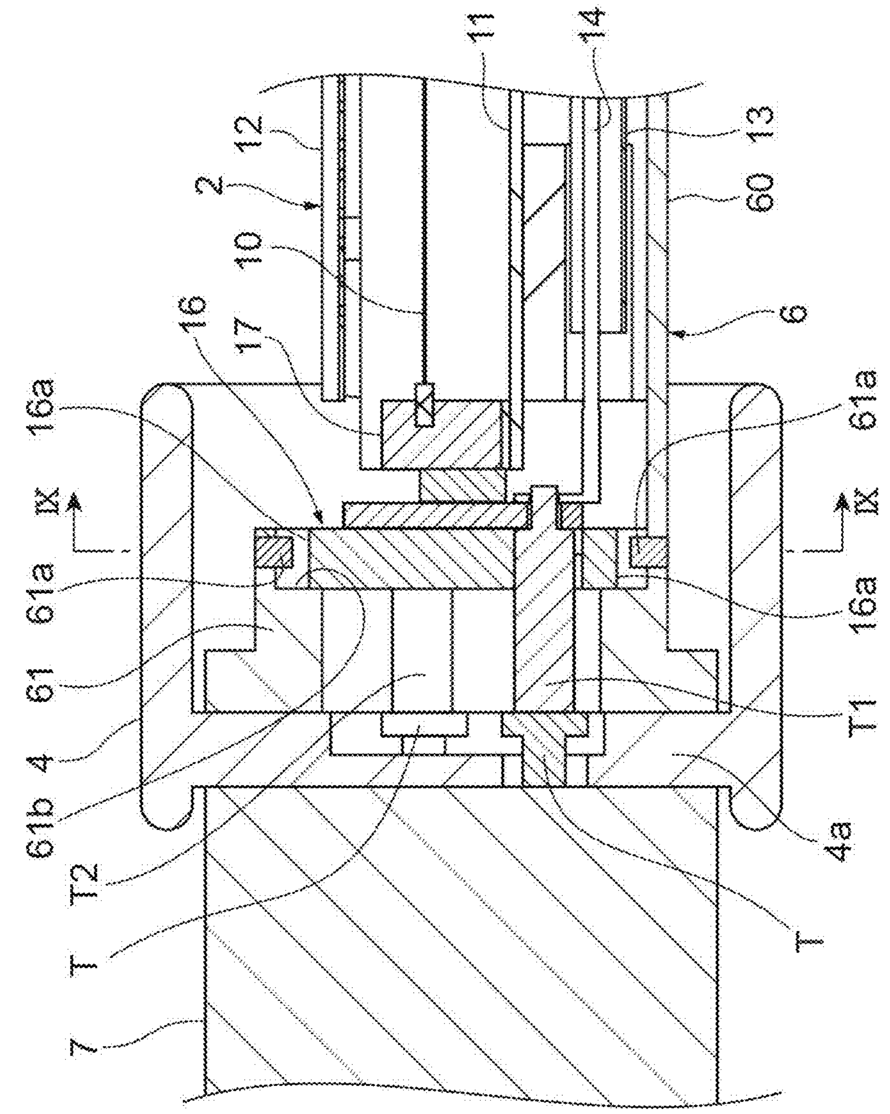
FIG. 7 is a cross-sectional view showing a configuration around an end of the filament unit on a side of a terminal holding member.
Figure 8:
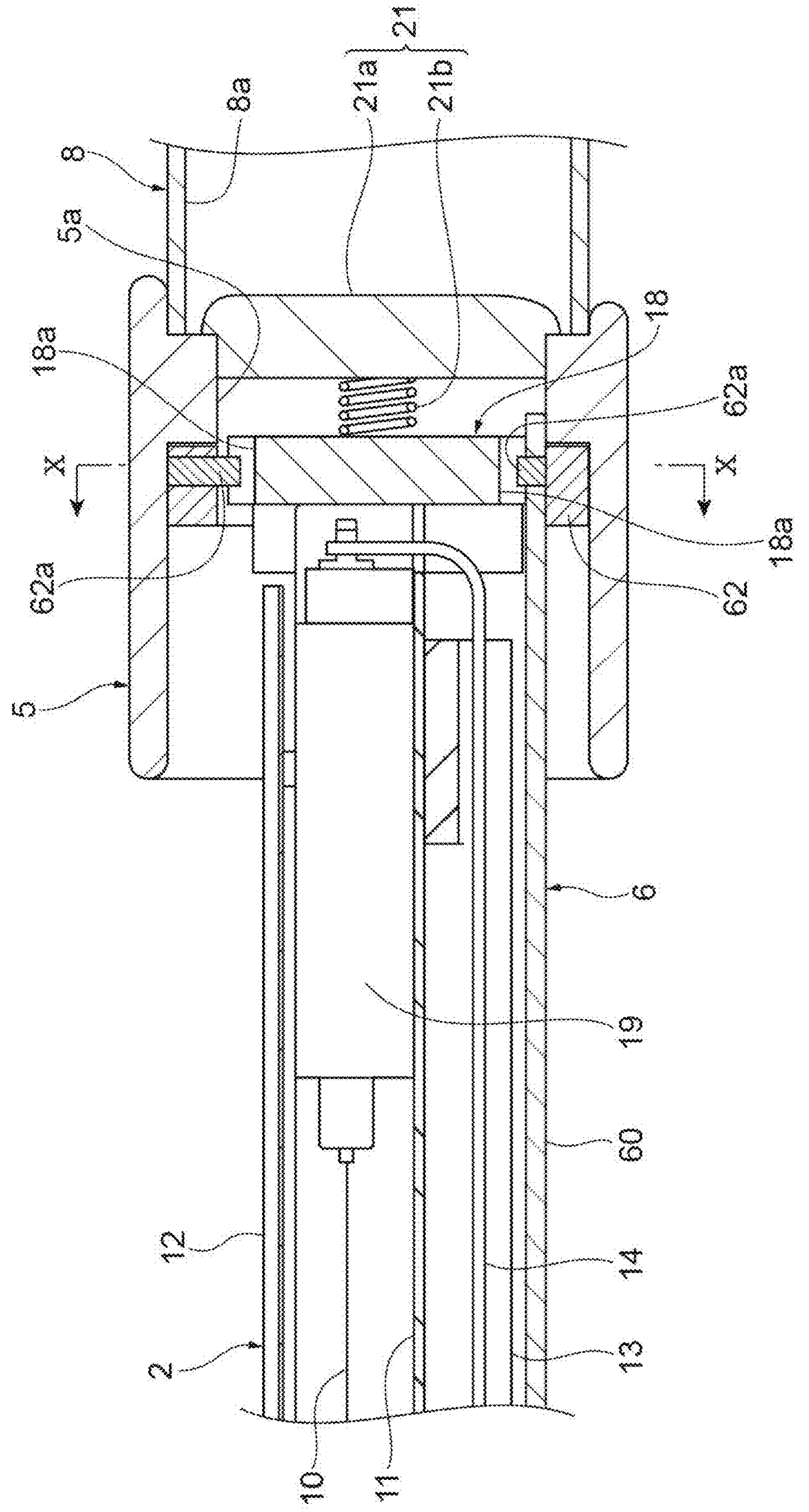
FIG. 8 is a cross-sectional view showing a configuration around an end of the filament unit on a side of a rotation restricting member.

As shown in FIGS. 6 to 8, the filament unit 2 is inserted into the inside (the inside space) of the rail 6 through the insertion opening 3*d* of the housing end plate 3*f*, the insertion hole 8*a* provided in the insulation support member 8, and the insertion hole 5*a* provided in the cathode holding member 5 with the other end provided with the terminal holding member 16 as a head and is fixed thereto. Here, the rail 6 includes a surrounding part 60, a first annular part 61, and a second annular part 62 as shown in FIGS. 7 and 8.

The surrounding part 60 surrounds a portion of the filament unit 2 provided with the filament 10. The surrounding part 60 is a long member having a substantially C-shaped cross section. As shown in FIG. 7, the first annular part 61 is connected to the other end of the surrounding part 60. The end of the rail 6 on a side of the first annular part 61 (the other side) is fixed to the cathode holding member 4. The cathode holding member 4 has a tubular shape to surround the other end of the rail 6 provided with the first annular part 61. As shown in FIG. 8, the second annular part 62 is connected to one end of the surrounding part 60. The end of the rail 6 on a side of the second annular part 62 (the one side) is fixed to the cathode holding member 5. The cathode holding member 5 has a tubular shape to surround the one end of the rail 6 provided with the second annular part 62.

As shown in FIG. 7, the first annular part 61 has a contact surface 61*b* facing one side, that is, a side of the insertion opening 3*d* of the housing end plate 3*f* (a side of the surrounding part 60). When the filament unit 2 is inserted into the rail 6, the contact surface 61*b* comes into contact with the other tip end surface of the filament unit 2 (the other end surface of the terminal holding member 16). Therefore, in the contact surface 61*b*, an insertion depth of the filament unit 2 can be determined. A position of the filament unit 2 in a state where the tip end surface of the filament unit 2 is in contact with the contact surface 61*b* is defined as an insertion completion position. The high voltage introduction insulation member 7 is in contact with the filament unit 2 in a state where the filament unit 2 is inserted into the rail 6 to the insertion completion position and is electrically connected to the filament unit 2.

More specifically, three connection terminals T for supplying electric power to the filament unit 2 are provided on a surface of the high voltage introduction insulation member 7 on a side of the rail 6 (the one side). The connection terminal T passes through a through hole provided in a wall 4*a* of the cathode holding member 4 not to come into contact with the cathode holding member 4 and is exposed on a side of the rail 6 (the one side). In a state where the filament unit 2 is inserted to the insertion completion position, tip ends of the filament terminal T1, the high voltage terminal T2, and the grid electrode terminal T3 are in contact with tip ends of three connection terminals provided in the high voltage introduction insulation member 7. As a result, the filament terminal T1 and the like are electrically connected to the connection terminals T of the high voltage introduction insulation member 7.

Here, the filament terminal T1 may be configured to be elastically deformable in an insertion direction of the filament unit 2. In this case, the filament terminal T1 can be more reliably in contact with the connection terminal T and electrically connected thereto. Further, an end surface of the filament terminal T1 and an end surface of the connection terminal T are in contact with each other. Therefore, even if a center position of the filament terminal T1 and a center position of the connection terminal T are misaligned, as long as the end surfaces are in contact with each other, the filament terminal T1 and the connection terminal T are electrically connected to each other. Similarly, even if a variation occurs in a projection length of each of the filament terminal T1 and the connection terminal T, the filament terminal T1 can absorb the variation in the projection length by elastically deforming and thus can come into contact with the connection terminal T. Further, an impact occurring when the filament unit 2 is inserted and the filament terminal T1 and the connection terminal T come into contact with each other can be alleviated by the elastic deformation of the filament terminal T1. Similarly, the high voltage terminal T2 and the grid electrode terminal T3 may be configured to be elastically deformable in the insertion direction of the filament unit 2. Similar to the filament terminal T1 and the like, the connection terminal T may be configured to be elastically deformable in the insertion direction of the filament unit 2.

Figure 9:
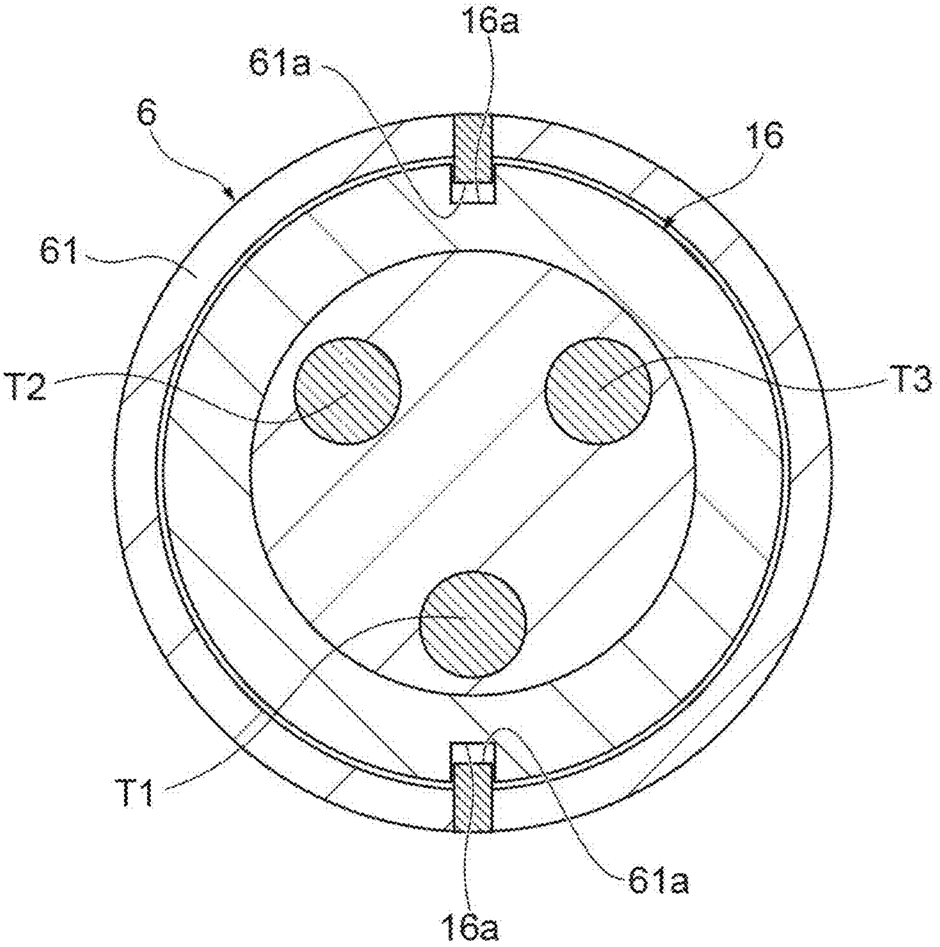
FIG. 9 is a cross-sectional view along line IX-IX of FIG. 7.

As shown in FIGS. 7 and 9, the first annular part 61 surrounds the terminal holding member 16 in a state where the tip end surface of the filament unit 2 is in contact with the contact surface 61*b*. In FIG. 9, the cathode holding member 4 is not shown. The first annular part 61 is provided with a guide projection (a projection) 61*a* that projects from the outer surface side (the outer peripheral side) of the first annular part 61 (the rail 6) toward the inner surface side (the inside) of the first annular part 61 (the rail 6). In the present embodiment, the first annular part 61 is provided with two guide projections 61*a*. The two guide projections 61*a* are provided to face each other with the axis L interposed therebetween in the direction of the axis L. When the filament unit 2 is inserted into the rail 6, the guide projection 61*a* of the first annular part 61 is fitted into the guide groove 16*a* of the terminal holding member 16 provided at the tip end of the filament unit 2. As a result, a position in a rotation direction (an orientation) with the extending direction of the filament unit 2 in the rail 6 as an axis is determined. Further, in the filament unit 2, it is possible to connect the three connection terminals T provided on the high voltage introduction insulation member 7 and the filament terminal T1 to the grid electrode terminal T3 to each other while aligning the terminals.

Figure 10:
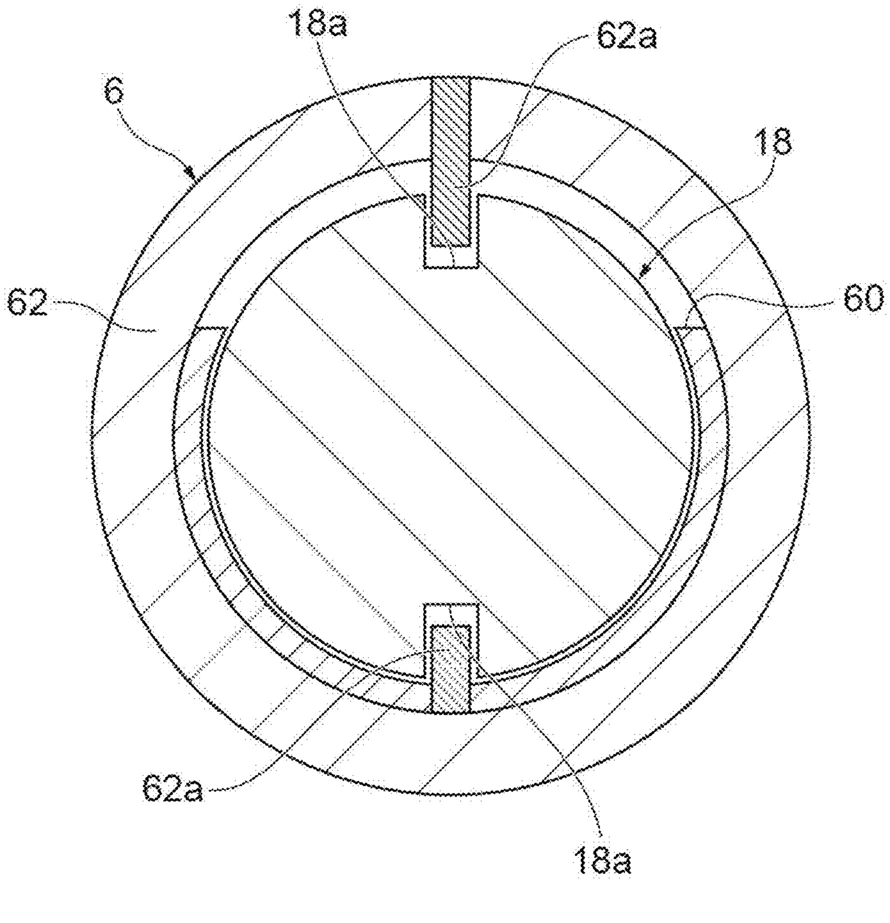
FIG. 10 is a cross-sectional view along line X-X of FIG. 8.

As shown in FIGS. 8 and 10, the second annular part 62 surrounds the rotation restricting member 18 in a state where the tip end surface of the filament unit 2 is in contact with the contact surface 61*b*. In FIG. 10, the cathode holding member 5 is not shown. The second annular part 62 is provided with a guide projection (a projection) 62*a* that projects from the outer surface side (the outer peripheral side) of the second annular part 62 (the rail 6) toward the inner surface side (the inside) of the second annular part 62 (the rail 6). In the present embodiment, the second annular part 62 is provided with two guide projections 62*a*. The two guide projections 62*a* are provided to face each other with the axis L interposed therebetween in the direction of the axis L. In this way, the guide projection 61*a* and the guide projection 62*a* are provided at the positions of both ends of the rail 6. In the present embodiment, the guide projection 61*a* and the guide projection 62*a* are provided such that the guide projection 61*a* and the guide projection 62*a* overlap each other in the direction of the axis L. When the filament unit 2 is inserted into the rail 6, the guide projection 62*a* of the second annular part 62 is fitted into the guide groove 18*a* of the rotation restricting member 18 provided in the filament unit 2. As a result, a position in a rotation direction (an orientation) with the extending direction of the filament unit 2 in the rail 6 as an axis is determined.

As shown in FIG. 8, a unit pressing part 21 is attached to the insertion hole 5*a* of the cathode holding member 5 in a state where the filament unit 2 is inserted into the rail 6. The unit pressing part 21 includes a fixing part 21*a* and a pressing member 21*b*. The fixing part 21*a* is detachably attached to the cathode holding member 5 to cover the insertion hole 5*a* of the cathode holding member 5. The pressing member 21*b* is attached to a surface of the other side of the fixing part 21*a* which is a side of the filament unit 2 (a side of the rail 6). The pressing member 21*b* presses the filament unit 2 toward the other side which is a deep side in the insertion direction (a side of the cathode holding member 4). The pressing member 21*b* is, for example, a compression spring. When the unit pressing part 21 press the filament unit 2, a state in which the tip end surface of the filament unit 2 is in contact with the contact surface 61*b* of the first annular part 61 is maintained. The unit pressing part 21 is not limited to being attached to the cathode holding member 5 and may be detachably attached to the insulation support member 8 or detachably attached to the housing end plate 3*f*.

The filament 10 discharges electrons when a high negative voltage such as minus several tens of kV to minus several hundreds of kV is applied in a state where the filament 10 is heated by energization in a state where the filament unit 2 is inserted into the rail 6 to the insertion completion position. A predetermined voltage is applied to the grid electrode 12. For example, a voltage on a positive side of about 100 V to 150 V with respect to the negative voltage applied to the filament 10 may be applied to the grid electrode 12. The grid electrode 12 forms an electric field for drawing out electrons and curbing diffusion of the electrons. As a result, the electrons discharged from the filament 10 are emitted to the front side as the electron beams EB from the holes provided in the grid electrode 12.

Here, the electron beam emission device 1 is installed such that the window 9 faces in a horizontal direction, for example, in a case where the electron beams EB are emitted in the horizontal direction. Further, the electron beam emission device 1 is installed such that the window 9 faces downward, for example, in a case where the electron beams EB are emitted downward. In this way, an orientation of the installation of the electron beam emission device 1 is determined according to an orientation of the emission of the electron beams EB. Even in a case where the electron beam emission device 1 is installed in various directions, the filament unit 2 can be stably disposed by the rail 6.

Figure 11:
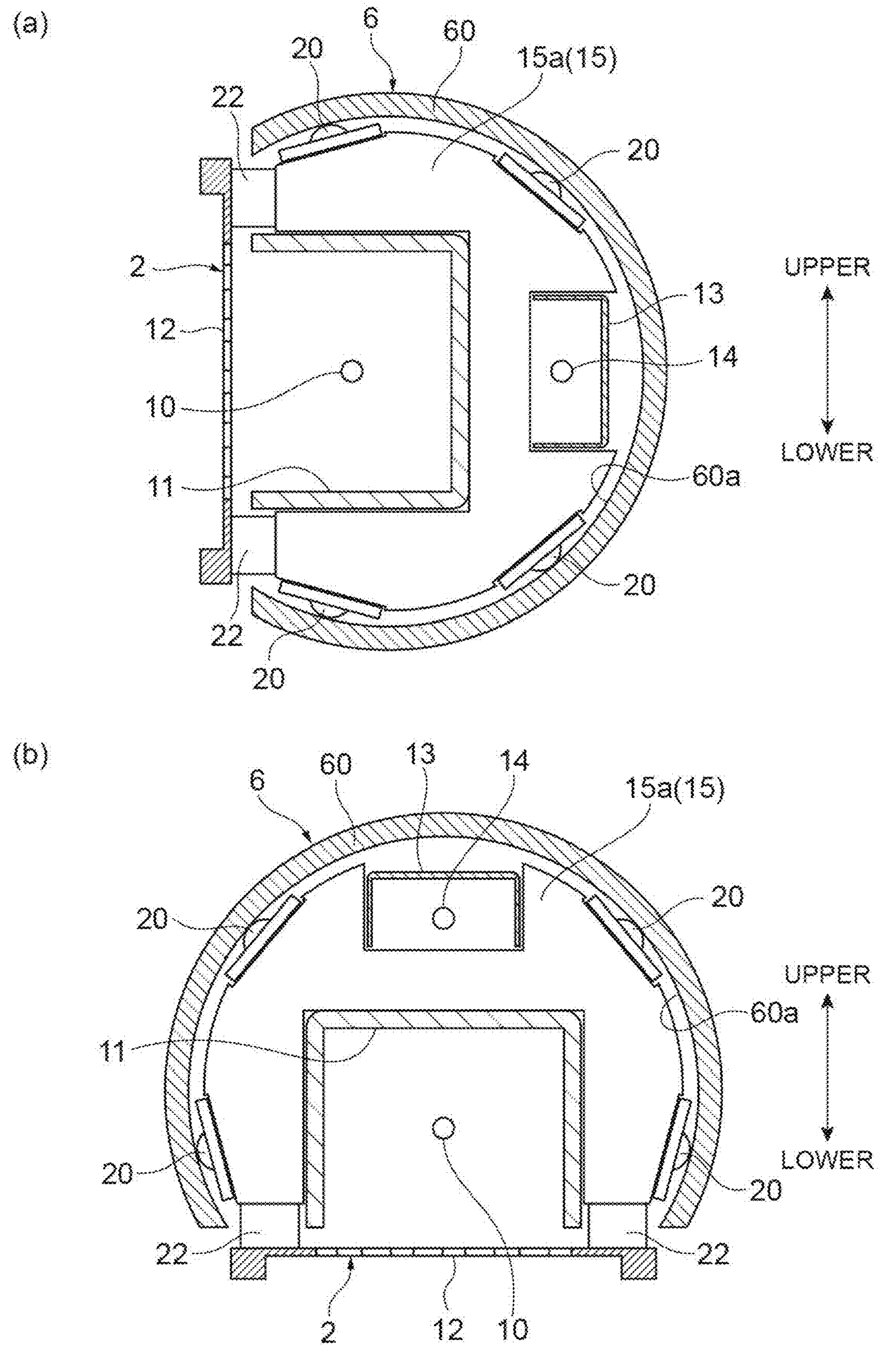
FIG. 11(*a*) is a cross-sectional view showing a configuration of the filament unit and the rail in a case where the filament unit emits electron beams in a horizontal direction.

Specifically, as shown in FIG. 11(*a*), four positioning parts 20 are provided on the outer surface of the first guide part 15*a* at predetermined intervals in the circumferential direction of the filament unit 2. Further, as shown in FIG. 11(*a*), in a case where the electron beams EB are emitted from the filament unit 2 in the horizontal direction, the four positioning parts 20 provided in the first guide part 15*a* are provided such that two positioning parts 20 are positioned on a surface facing downward in the guide member 15 (the filament unit 2). The surface facing downward includes not only a surface facing directly downward but also a surface facing diagonally downward. That is, the surface facing downward is a surface facing downward rather than in the horizontal direction. As a result, even in a case where the filament unit 2 is affected by gravity, the two positioning parts 20 provided on the surface facing downward are in contact with the inner surface 60*a* of the surrounding part 60 of the rail 6.

As shown in FIG. 11(*b*), in a case where the electron beams EB are emitted from the filament unit 2 in a direct downward direction, the four positioning parts 20 provided in the first guide part 15*a* are provided such that two positioning parts 20 are positioned on a surface facing downward in the guide member 15 (the filament unit 2). As a result, even in a case where the filament unit 2 is affected by gravity, the two positioning parts 20 provided on the surface facing downward are in contact with the inner surface 60*a* of the surrounding part 60 of the rail 6.

Further, as in the cases where the electron beams EB are emitted in the horizontal direction and in the direct downward direction, even in a case where the electron beams EB are emitted from the filament unit 2 in a direct upward direction, the four positioning parts 20 provided in the first guide part 15*a* are provided such that two positioning parts 20 are positioned on a surface facing downward in the guide member 15 (the filament unit 2).

In this way, even in a case where the electron beam emission device 1 is installed such that the electron beams EB are emitted in any direction, the filament unit 2 is disposed in a stable state with respect to the rail 6 by the two positioning parts 20 provided on the surface facing downward in the first guide part 15*a*. The second guide part 15*b* and the third guide part 15*c* also have the same arrangement configuration of the positioning parts 20 as the first guide part 15*a*. As a result, even in a case where the electron beam emission device 1 is installed such that the electron beams EB are emitted in any direction, the filament unit 2 can be disposed in a stable state with respect to the rail 6 by the positioning parts 20 provided in the second guide part 15*b* and the positioning parts 20 provided in the third guide part 15*c*.

Further, the electron beam emission device 1 may be disposed to emit the electron beams EB in various directions such as a diagonally downward direction and a diagonally upward direction without being limited to the cases where the electron beams EB are emitted in the horizontal direction, the direct downward direction, and the direct upward direction. Even in this case, it is sufficient that two positioning parts 20 are provided on the surface facing downward for each of the first guide part 15*a* to the third guide part 15*c*.

In this way, in a state where the filament unit 2 is disposed to emit the electron beams EB toward a first direction, the plurality of positioning parts 20 provided in the first guide part 15*a* are disposed such that two or more positioning parts 20 are provided on a surface facing downward in the first guide part 15*a* (the filament unit 2). Further, in a state where the filament unit 2 is disposed to emit the electron beams EB toward a second direction different from the first direction, the plurality of positioning parts 20 provided in the first guide part 15*a* are disposed such that two or more positioning parts 20 are provided on a surface facing downward in the first guide part 15*a* (the filament unit 2). The positioning parts 20 provided in each of the second guide part 15*b* and the third guide part 15*c* also have the same arrangement as the positioning parts 20 provided in the first guide part 15*a*.

Further, in the plurality of positioning parts 20 provided in the first guide part 15*a*, the maximum interval between the positioning parts 20 in the circumferential direction of the filament unit 2 is shorter than a half circumference. The interval between the positioning parts 20 provided in each of the second guide part 15*b* and the third guide part 15*c* is also the same as that between the positioning parts 20 provided in the first guide part 15*a*.

The four positioning parts 20 provided in the first guide part 15*a* may be provided line-symmetrically with respect to a desired reference line or point-symmetrically with respect to a predetermined reference point in the extending direction of the filament 10. The positioning parts 20 provided in each of the second guide part 15*b* and the third guide part 15*c* may also have the same arrangement as the positioning parts 20 provided in the first guide part 15*a*.

As described above, in the electron beam emission device 1, the plurality of positioning parts 20 that are slidably in contact with the inner surface 60*a* of the rail 6 are provided between the outer surface of the filament unit 2 and the inner surface 60*a* of the rail 6. That is, the long filament unit 2 is disposed in the rail 6 by being supported at a plurality of positions where the positioning parts 20 are provided. As a result, in the electron beam emission device 1, the positioning part 20 of the filament unit 2 is easily brought into contact with the inner surface 60*a* of the rail 6 as compared with, for example, a case where the entire lower surface of the filament unit 2 is brought into contact with a bottom surface of the rail 6. That is, in the electron beam emission device 1, since the filament unit 2 has the plurality of positioning parts 20, the filament unit 2 can be held by the rail 6 while the positioning of the filament unit 2 with respect to the rail 6 is performed. As described above, in the electron beam emission device 1, it is possible to stably dispose the filament unit 2 even if the filament unit 2 has a long shape.

The three connection terminals T provided in the high voltage introduction insulation member 7 are in contact with the filament terminal T1 to the grid electrode terminal T3 of the filament unit 2 in a state where the filament unit 2 is inserted into the rail 6 to the insertion completion position and are electrically connected thereto. In this case, in the electron beam emission device 1, it is possible to electrically connect the filament unit 2 and the high voltage introduction insulation member 7 to each other by performing work of disposing the filament unit 2 in the rail 6 (work of inserting the filament unit 2 into the rail 6) without performing special work for connecting the filament unit 2 and the connection terminal T of the high voltage introduction insulation member 7.

The insertion opening 3*d* which is opened and closed by the lid 3*e* is provided at a portion of the vacuum container 3 facing the one end of the rail 6. In this case, in the electron beam emission device 1, the filament unit 2 can be attached to and detached from the one end of the rail 6 via the insertion opening 3*d* of the vacuum container 3.

The positioning part 20 includes the spherical body 20*a*. In this case, the filament unit 2 can smoothly slide in the rail 6 by the spherical body 20*a* of the positioning part 20 being rotated. As a result, in the electron beam emission device 1, it is possible to easily attach and detach the filament unit 2 to and from the rail 6.

The positioning part 20 is provided in each of the first guide part 15*a* to the third guide part 15*c* provided in the extending direction of the filament 10. That is, the plurality of positioning parts 20 are provided in the extending direction of the filament 10. In this case, in the electron beam emission device 1, it is possible to curb the filament unit 2 being slantwise accommodated with respect to the extending direction of the rail 6, and it is possible to stably dispose the filament unit 2.

The positioning part 20 is provided at each of both ends of the filament unit 2. In this case, in the electron beam emission device 1, it is possible to further curb the filament unit 2 being slantwise accommodated with respect to the extending direction of the rail 6, and it is possible to further stably dispose the filament unit 2.

The tip end side portion Y of the filament unit 2 is provided with the first guide part 15*a* and the second guide part 15*b* each including the positioning part 20. In this case, in the electron beam emission device 1, when the long filament unit 2 is inserted into the rail 6, the positioning parts 20 of the first guide part 15*a* and the second guide part 15*b* disposed in the tip end side portion Y on the tip end side in the insertion direction into the rail 6 come into contact with the inner surface 60*a* of the rail 6 at an early stage of insertion. That is, in the electron beam emission device 1, when the long filament unit 2 is inserted, the filament unit 2 is positioned with respect to the rail 6 at the early stage. As a result, in the electron beam emission device 1, it is possible to stably attach and detach the filament unit 2 to and from the rail 6 even in a case where the filament unit 2 has a long shape. Further, it is possible to curb the filament unit 2 being inserted in an inclined state, and it is possible to curb the filament unit 2 buffering to other parts.

The plurality of positioning parts 20 are provided on the outer surface of the filament unit 2 in the circumferential direction of the filament unit 2. In this case, in the electron beam emission device 1, it is possible to stabilize the position of the filament unit 2 in the rail 6 in a direction orthogonal to the extending direction of the filament unit 2.

The guide projection 61*a* provided in the first annular part 61 of the rail 6 is fitted into the guide groove 16*a* of the terminal holding member 16 provided at the end of the filament unit 2. Further, the guide projection 62*a* provided in the second annular part 62 of the rail 6 is fitted into the guide groove 18*a* of the rotation restricting member 18 provided at the end of the filament unit 2. In this case, in the electron beam emission device 1, the position (the orientation) of the filament unit 2 in the rotation direction when seen in the extending direction of the filament unit 2 can be determined by the guide grooves 16*a* and 18*a* and the guide projections 61*a* and 62*a*.

Further, the guide grooves 16*a* and 18*a* are provided at both ends of the filament unit 2. The guide projections 61*a* and 62*a* are provided at both ends of the rail 6. In this case, in the electron beam emission device 1, the position of the filament unit 2 in the rotation direction at both ends of the filament unit 2 can be determined, and the filament unit 2 can be stably disposed. Further, for example, when the filament unit 2 is inserted into the rail 6 such that the guide projections 61*a* and 62*a* are fitted into the guide grooves 16*a* and 18*a*, respectively, the guide projections 61*a* and the guide groove 16*a* on the deep side in the insertion direction (the other side) may not be visible to the operator. Even in this case, when the guide projection 62*a* is fitted into the guide groove 18*a* on the front side (the one side) in the insertion direction, the guide projection 61*a* is also fitted into the guide groove 16*a* on the deep side in the insertion direction. In this way, even if the electron beam emission device 1 has a configuration in which the guide grooves 16*a* and 18*a* are provided at both ends of the filament unit 2 for determining the positions in the rotation direction, the filament unit 2 can be easily inserted into the rail 6 and disposed therein.

Although the embodiment and various modification examples of the present disclosure have been described above, the present disclosure is not limited to the above embodiment and various modification examples. For example, the positioning part 20 is not limited to the case where it is provided on the outer surface of the filament unit 2 and may be provided on the inner surface 60*a* of the rail 6. In this case, the positioning part 20 comes into contact with the outer surface of the filament unit 2. Further, the positioning part 20 is not limited to the configuration including the spherical body 20*a*. For example, the outer surface of the positioning part 20 may be a protrusion having a protruding curved surface shape. In this case, the filament unit 2 can slide smoothly with respect to the inner surface 60*a* of the rail 6 while curbing the protrusion having the protruding curved surface shape, which is the positioning part, being caught. As a result, in the electron beam emission device 1, it is possible to easily attach and detach the filament unit 2 to and from the rail 6. In a case where the positioning part 20 is a protrusion, the outer surface of the positioning part 20 does not have to be in a protruding curved surface shape. The positioning part 20 is not limited to being provided on the outer surface of the guide member 15. The positioning part 20 may be provided directly on the outer surface of the rail 6 or the like. The guide member 15 has three guide parts like the first guide part 15*a* to the third guide part 15*c*, but the number of guide parts is not limited to three. Further, the number of positioning parts 20 provided in one guide part is not limited to four.

The guide projections 61*a* and 62*a* for determining the position of the filament unit 2 in the rotation direction are not limited to being provided at both ends of the rail 6. For example, one or a plurality of guide projections may be provided at positions between both ends of the rail 6 in addition to both ends of the rail 6, or the guide projections may be provided on the rail 6 as a whole in the extending direction of the rail 6. In this case, the position of the filament unit 2 in the rotation direction is determined even in the middle of being inserted into the rail 6. Further, the rail 6 is provided with the guide projections 61*a* and 62*a*, and the filament unit 2 is provided with the guide grooves 16*a* and 18*a*, but the present disclosure is not limited thereto. For example, the rail 6 may be provided with the guide groove, and the filament unit 2 may be provided with the guide projection.

A method of supplying electric power from the high voltage introduction insulation member 7 to the filament unit 2 is not limited to a method using the filament terminal T1 to the grid electrode terminal T3. The insulation support member 8 does not have to be fixed to the housing end plate 3*f*. For example, one end of the insulation support member 8 may be fixed to the inner peripheral surface of the cylindrical portion of the vacuum container 3, and the other end of the insulation support member 8 may fix the cathode holding member 5.

The surrounding part 60 of the rail 6 is not limited to a shape having a substantially C-shaped cross section. For example, the surrounding part 60 may have a polygonal cross section. The shape of the guide member 15 is not limited to the shape described above and may be a shape corresponding to the surrounding part 60.

Further, the electron beam emission device 1 as the energy beam emission device may be configured as an X-ray emission device that emits X-rays. In a case where the electron beam emission device 1 is configured as an X-ray emission device, the electron beam emission device 1 includes an X-ray target (for example, tungsten, molybdenum, or the like) which is an X-ray generation part that generates X-rays when the electron beams EB discharged from the filament unit 2 are incident and can emit X-rays generated by the X-ray target from the window 9. In this case, as an example, the window 9 shown in FIG. 1 may be changed to a window for X-ray emission constituted by a window material having a high X-ray permeability (for example, beryllium, diamond, or the like) and the X-ray target provided on a surface of the window material on a side of the vacuum space R. As a result, the electron beams EB emitted from the filament unit 2 can be incident on the X-ray target, and the X-rays can be emitted from the X-ray target.

At least a part of the above-described embodiment and various modification examples may be arbitrarily combined.

REFERENCE SIGNS LIST

- 1 Electron beam emission device (energy beam emission device)
- 2 Filament unit (electron discharge unit)
- 3 Vacuum container (housing)
- 3*d* Insertion opening (introduction opening)
- 3*e* Lid
- 6 Rail (unit accommodation part)
- 7 High voltage introduction insulation member (power supply part)
- 10 Filament (electron discharge part)
- 16 Terminal holding member (rotation restricting member)
- 16*a*, 18*a* Guide groove (groove)
- 18 Rotation restricting member
- 20 Positioning part
- 20*a* spherical body
- 20*b* Holding part
- 61*a*, 62*a* Guide projection (projection)

The invention claimed is:

1. An electron beam emission device comprising:

an electron discharge unit having a long electron discharge part;

a housing having a window from which electron beams are emitted on the basis of electrons discharged from the electron discharge part; and a unit accommodation part fixed in the housing, having a long tubular shape capable of accommodating the electron discharge unit, and having an electron discharge opening formed in a portion of an outer peripheral surface facing the window, wherein a plurality of positioning parts are provided along a circumferential direction on an outer surface of the electron discharge unit or on an inner surface of the unit accommodation part, the positioning parts being slidably in contact with the outer surface of the electron discharge unit or the inner surface of the unit accommodation part and performing positioning of the electron discharge part with respect to the unit accommodation part, wherein when the electron discharge unit is oriented to emit the electron beams in a horizontal direction, at least one of the plurality of positioning parts is positioned on a portion of the outer surface of the electron discharge unit or on a portion of the inner surface of the unit accommodation part that faces a downward direction of gravity, wherein when the electron discharge unit is oriented to emit the electron beams in a vertical direction, at least one of the plurality of positioning parts is positioned on a portion of the outer surface of the electron discharge unit or on a portion of the inner surface of the unit accommodation part that faces a downward direction of gravity, wherein the electron discharge unit is capable of being inserted into the unit accommodation part from an end of the unit accommodation part, wherein the plurality of positioning parts are provided in an extending direction of the electron discharge part, and wherein positioning parts of the plurality of positioning parts are provided on the outer surface of the electron discharge unit at each of a plurality of positions in the extending direction of the electron discharge part on a tip end side of the electron discharge unit with respect to a central position in the extending direction of the electron discharge part, in an insertion direction of the electron discharge unit into the unit accommodation part.

2. The electron beam emission device according to claim 1, further comprising:

a power supply part configured to supply electric power to the electron discharge unit, wherein the electron discharge unit is capable of being inserted into the unit accommodation part from one end of the unit accommodation part, and wherein the power supply part is provided in the housing on the other end side of the unit accommodation part and is in contact with the electron discharge unit to be electrically connected to the electron discharge unit in a state where the electron discharge unit is inserted into the unit accommodation part.

3. The electron beam emission device according to claim 2, wherein one end of the housing is provided with an introduction opening into which the electron discharge unit is capable of being introduced and which is opened and closed by a lid.

4. The electron beam emission device according to claim 1, wherein an outer surface of each positioning part of the plurality of positioning parts has a protruding curved surface shape.

5. The electron beam emission device according to claim 1, wherein each positioning part of the plurality of positioning parts includes a spherical body that is in contact with the outer surface of the electron discharge unit or the inner surface of the unit accommodation part and a holding part that rotatably holds the spherical body.

6. The electron beam emission device according to claim 1, wherein at least one positioning part of the plurality of positioning parts is provided at each of both ends of the electron discharge part.

7. The electron beam emission device according to claim 1, wherein the plurality of positioning parts are provided in the circumferential direction of the electron discharge unit.

8. The electron beam emission device according to claim 1, further comprising:

a projection projecting from an outer surface side of the unit accommodation part toward an inner surface side of the unit accommodation part, wherein the electron discharge unit further has a rotation restricting member in which a groove is formed in an outer edge thereof, wherein the groove extends in a direction along a longitudinal axis of the electron discharge part, and wherein a position of the electron discharge unit in a rotation direction in the unit accommodation part is determined by the projection being fitted into the groove.

9. The electron beam emission device according to to of claim 8, wherein the projection is provided on each of both end sides of the unit accommodation part, and wherein the rotation restricting member is provided on each of both end sides of the electron discharge unit.

* * * * *